(12) United States Patent
Afajalpurkar et al.

(10) Patent No.: US 10,781,549 B2
(45) Date of Patent: Sep. 22, 2020

(54) DUAL DRAIN SYSTEM WITH Y-HOSE

(71) Applicant: WHIRLPOOL CORPORATION, Benton Harbor, MI (US)

(72) Inventors: Vinayak A. Afajalpurkar, Pune (IN); Lucien Bourbeau, Assonet, MA (US); Eamon C. Lyons, Somerset, MA (US)

(73) Assignee: Whirlpool Corporation, Benton Harbor, MI (US)

( * ) Notice: Subject to any disclaimer, the term of this patent is extended or adjusted under 35 U.S.C. 154(b) by 29 days.

(21) Appl. No.: 16/263,598

(22) Filed: Jan. 31, 2019

(65) Prior Publication Data

US 2020/0248380 A1    Aug. 6, 2020

(51) Int. Cl.
*D06F 39/08*     (2006.01)
*D06F 39/00*     (2020.01)
*A47L 15/42*     (2006.01)
*F16K 11/24*     (2006.01)
*F16L 41/02*     (2006.01)

(52) U.S. Cl.
CPC ........ *D06F 39/083* (2013.01); *A47L 15/4219* (2013.01); *A47L 15/4223* (2013.01); *D06F 39/006* (2013.01); *F16K 11/24* (2013.01); *F16L 41/023* (2013.01)

(58) Field of Classification Search
None
See application file for complete search history.

(56) References Cited

U.S. PATENT DOCUMENTS

| | | | |
|---|---|---|---|
| 2,962,048 A * | 11/1960 | Steidley | F16T 1/00 137/565.17 |
| 3,480,040 A | 11/1969 | Erickson | |
| 5,928,490 A * | 7/1999 | Sweeney | C02F 1/46104 204/238 |
| 6,148,850 A | 11/2000 | Kopp et al. | |
| 6,234,193 B1 | 5/2001 | Hobbs et al. | |
| 6,792,776 B2 | 9/2004 | Bruntz et al. | |
| 10,422,279 B2 * | 9/2019 | Owdeh | F02C 6/08 |
| 2015/0240408 A1 * | 8/2015 | Favaro | D06F 39/083 68/17 R |
| 2016/0195208 A1 * | 7/2016 | Cassiday | F16L 31/02 285/125.1 |
| 2017/0145612 A1 * | 5/2017 | Zattin | A47L 15/0021 |
| 2018/0023239 A1 | 1/2018 | Peng et al. | |

FOREIGN PATENT DOCUMENTS

| | | |
|---|---|---|
| CN | 2463426 | 12/2001 |
| CN | 200961207 | 10/2007 |
| CN | 200988917 | 12/2007 |
| CN | 201704552 | 1/2011 |
| CN | 202000150 | 10/2011 |
| CN | 102995715 | 1/2014 |

(Continued)

*Primary Examiner* — John Fox
(74) *Attorney, Agent, or Firm* — Price Heneveld LLP

(57) ABSTRACT

The disclosure provides for a drain system for an appliance. The drain system can include a Y-hose having a flexible end coupled to a supply of water from tub, a recirculating end, and a drain end, a recirculating valve coupled with the recirculating end, a drain valve spaced from the recirculating valve and coupled with the drain end, and wherein the recirculating end and the drain end are connected via a continuous connecting wall.

20 Claims, 4 Drawing Sheets

(56) References Cited

FOREIGN PATENT DOCUMENTS

| | | |
|---|---|---|
| CN | 105803734 | 7/2016 |
| DE | 19621885 A1 | 12/1997 |
| DE | 202005019491 U1 | 3/2006 |
| EP | 3000926 A1 | 3/2016 |
| GB | 1374172 | 11/1974 |
| KR | 20040011978 A | 2/2004 |

* cited by examiner

US 10,781,549 B2

DUAL DRAIN SYSTEM WITH Y-HOSE

BACKGROUND

The present disclosure generally relates to an appliance drain system, and more specifically, to a drain system for a washing machine.

SUMMARY

In at least one aspect, the disclosure provides for a drain system for an appliance. The drain system can include a Y-hose having a flexible end coupled to a supply of water from an appliance, a recirculating end, and a drain end, a recirculating valve having a recirculating inlet coupled to the recirculating end at a recirculating inlet side and a recirculating outlet coupled to a first hose at a recirculating outlet side, a drain valve spaced from the recirculating valve having a drain inlet coupled to the drain end at a drain inlet side and a drain outlet coupled to a second hose at a drain outlet side, a recirculating solenoid coupled to the recirculating valve on a recirculating solenoid side of the recirculating valve, and a drain solenoid coupled to the drain valve on a drain solenoid side of the drain valve.

In at least another aspect, the disclosure provides for a drain system for an appliance. The drain system can include a Y-hose having a flexible end coupled to a supply of water from a tub, a recirculating end, and a drain end, a recirculating valve coupled with the recirculating end, a drain valve spaced from the recirculating valve and coupled with the drain end, and wherein the recirculating end and the drain end are connected via a continuous connecting wall defining a hollow arc.

In at least another aspect, the disclosure provides for a drain system for an appliance. The drain system can include a Y-hose having a flexible end coupled to a supply of water from a tub, a recirculating end, and a drain end, a recirculating valve having a recirculating inlet rigidly coupled to the recirculating end at a recirculating inlet side and a recirculating outlet coupled to a first hose at a recirculating outlet side, a drain valve spaced from the recirculating valve having a drain inlet rigidly coupled to the drain end at a drain inlet side and a drain outlet coupled to a second hose at a drain outlet side, a recirculating solenoid coupled to the recirculating valve on a recirculating solenoid side of the recirculating valve, a drain solenoid coupled to the drain valve on a drain solenoid side of the drain valve, and wherein the recirculating outlet and the drain outlet are arranged on opposite sides of the recirculating valve and the drain valve and the first hose is coupled to a recirculation hose fluidly coupled with the appliance.

These and other features, advantages, and objects of the present device will be further understood and appreciated by those skilled in the art upon studying the following specification, claims, and appended drawings.

DETAILED DESCRIPTION OF EMBODIMENTS

Figure 1:
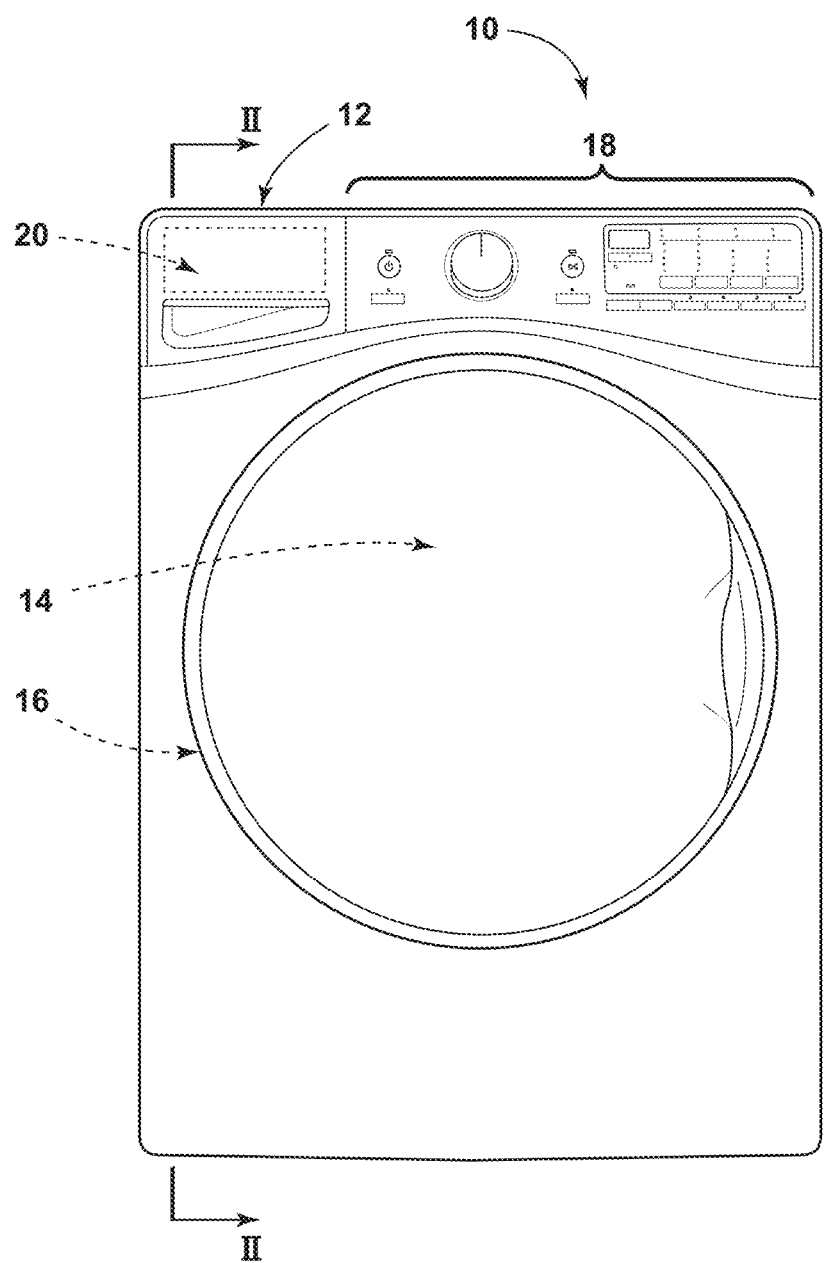
FIG. 1 is a front elevational view of a laundry appliance, according to various aspects described herein.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present disclosure provides various structures and components for a drain system for an appliance, such as a laundry appliance 10 shown in the illustrated embodiment. According to aspects described herein, the drain system may include structures to facilitate the movement and evacuation of a supply of water from the appliance 10.

FIG. 1 is a schematic illustration of a washing machine 10, which will not be described in detail except as necessary for a complete understanding of the disclosure. It should be understood that the washing machine 10 can include any suitable washing appliance, including a vertical-axis clothes washer, horizontal-axis clothes washer, combination washer-dryer, freestanding dishwasher, or under-counter dishwasher, in non-limiting examples on which various aspects of the presently disclosed drain system may be used. The washing machine 10, can include a cabinet 12 defining an interior of the washing machine 10, and a tub 14 provided within the cabinet 12 at least partially defining a treating chamber for receiving articles for treatment, such laundry. The tub 14 may be rotationally operable within the cabinet 12 that serves as a housing for the components of the washing machine 10. The washing machine 10 may further include a door 16 for accessing the tub 14 and one or more controls 18 for initiating a washing function of the washing machine 10.

The controls 18 can be electrically coupled with a controller 20 located within the cabinet 12. The controller 20 can include the machine controller and any additional controllers provided for controlling any of the components of the washing machine 10. Many known types of controllers can be used for the controller 20. It is contemplated that the controller 20 is a microprocessor-based controller that implements control software and sends/receives one or more electrical signals to/from each of the various working components to effect the control software.

Figure 2:
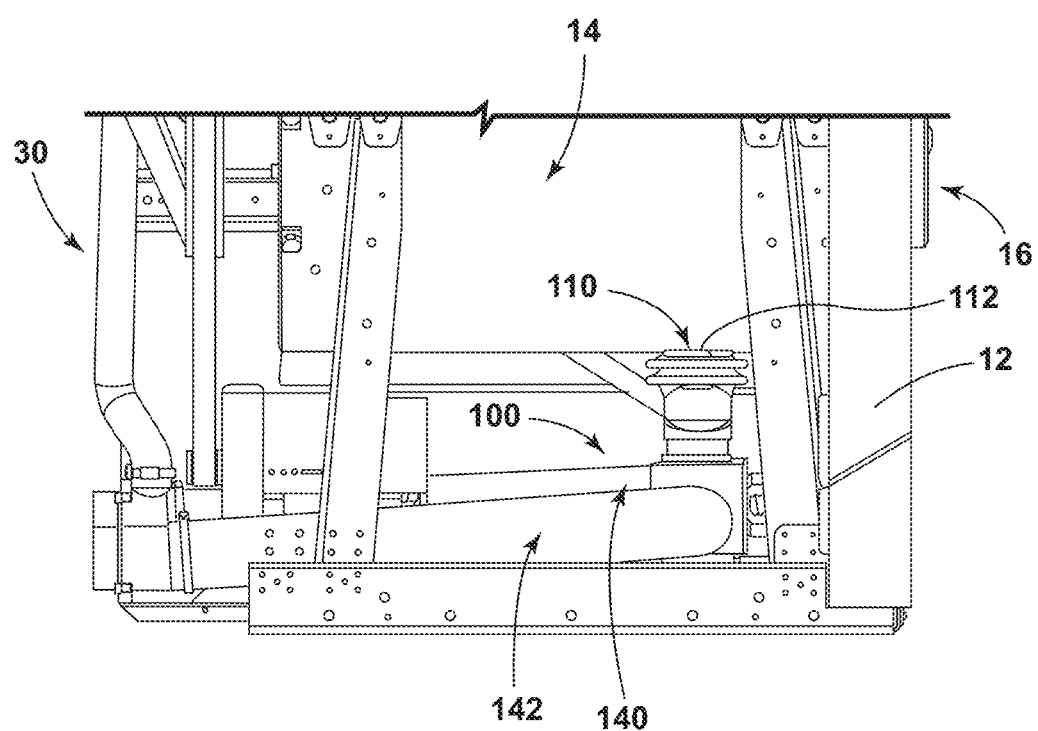
FIG. 2 is a partial cross-sectional view of the laundry appliance taken along line II of FIG. 1.

FIG. 2 illustrates a partial cross-sectional view of the washing machine 10 taken along line II of FIG. 1 and showing only the lower portion of the appliance. The cabinet 12 can be a housing having a chassis and/or a frame, enclosing components typically found in a conventional washing machine, such as a motors, pumps, fluid lines, controls, sensors, transducers, and the like. Such components will not be described further herein except as necessary for a complete understanding of the disclosure. The tub 14 may be supported within the cabinet 12 by any suitable suspension system.

Figure 3:
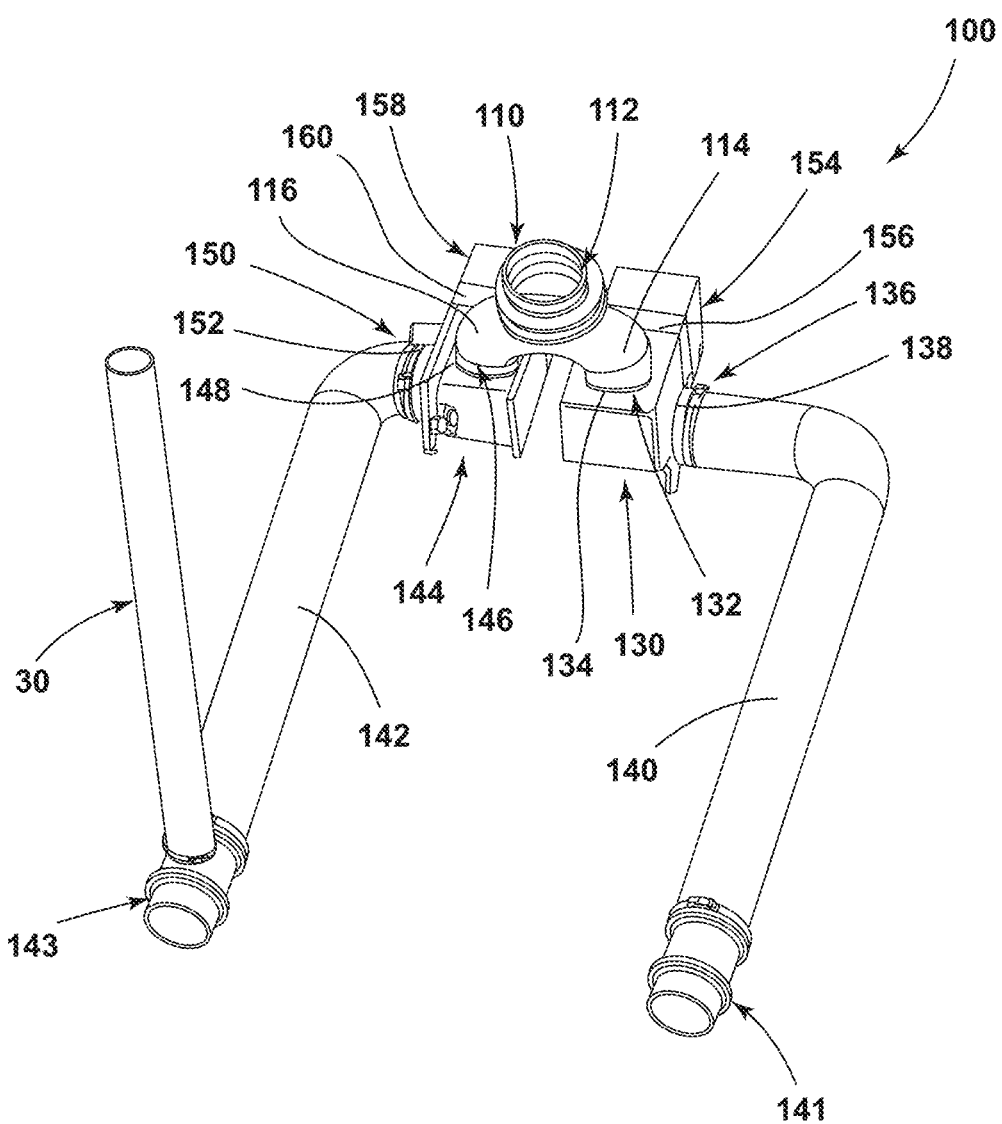
FIG. 3 is a perspective view of a drain system according to various aspects described herein.

Referring now to FIGS. 2 and 3, the washing machine 10 can further include a recirculation system and drain system 100 for recirculating liquid back to the tub 14 and draining liquid from the tub 14, respectively. The drain system 100 may include an over-flow tube 30 for draining any over-flow liquid or suds that may occur. A coupler may be configured to couple the drain system 100 to a supply of water from the washing machine 10, which may include water from the tub 14. A supply of water can include fresh water, wash water, laundry chemistry, and the like. The coupler may be in the form of a Y-hose 110 having a flexible end 112 coupled to the tub 14. The flexible end 112 can be directly, or indirectly coupled to the tub 14 and may provide for sufficient tolerance of movement of the tub 14. The drain system 100 can further include a first hose 140 and a second hose 142, or dual hoses, configured to allow the passage of water from the Y-hose 110 for a variety of purposes such as draining, recirculating, or storing. In some examples, the Y-hose 110 may be arranged towards a front of the washing machine 10, adjacent the door 16, such that the first hose 140 and second hose 142 are directed from the front of the washing machine 10 towards a rear of the washing machine 10.

FIG. 3 is a perspective view of the drain system 100. The drain system 100 can further include a recirculating valve 130 spaced from a drain valve 144. The recirculating valve 130 and the drain valve 144 may be used for a variety of applications and are not limited to recirculating and draining only. For example, the drain valve 144 may be fluidly coupled to a storage container. The recirculating valve 130 can include a body having at least a recirculating inlet side 134, a recirculating outlet side 138, and a recirculating solenoid side 156. The recirculating inlet side 134 may include an inlet port, or a recirculating inlet 132 and the recirculating outlet side 138 may include an outlet port, or a recirculating outlet 136. The drain valve 144 can include a body having at least a drain inlet side 148, a drain outlet side 152, and a drain solenoid side 160. The drain inlet side 148 may include an inlet port, or a drain inlet 146 and the drain outlet side 152 may include an outlet port, or a drain outlet 150. In some examples, the recirculating valve 130 and the drain valve 144 include identical or mirrored configurations.

The Y-hose 110 may further include a recirculating end 114 spaced from an outlet end, or drain end 116. The recirculating end 114 may be coupled with the recirculating inlet 132 and the drain end 116 may be coupled with the drain inlet 146 such that the recirculating valve 130 and the drain valve 144 are in fluid communication with the tub 14 via the Y-hose 110 and are arranged in a side-by-side configuration. In some examples, the recirculating end 114 is rigidly coupled with the recirculating inlet 132 and the drain end 116 is rigidly coupled with the drain inlet 146 such that the spacing between the recirculating valve 130 and the drain valve 144 can be substantially maintained.

Furthermore, the first hose 140 may be coupled to the recirculating outlet 136 and the second hose 142 may be coupled to the drain outlet 150. In some examples, the recirculating outlet 136 and the drain outlet 150 are arranged on opposite, or opposing sides of the recirculating valve 130 and the drain valve 144 such that the first hose 140 and the second hose 142 are arranged at outer sides of the drain system 100. It is also contemplated that the recirculating outlet 136 and the drain outlet 150 are the same, or corresponding sides, of the recirculating valve 130 and the drain valve 144 such that the first hose 140 and the second hose 142 are arranged in a side-by-side configuration. At least one of the first hose 140 and the second hose 142 may be coupled with the over-flow tube 30. The first hose 140 and the second hose 142 may include an outlet end 141 and an outlet end 143, respectively, downstream of the recirculating outlet 136 and the drain outlet 150, which may be coupled with further components of the washing machine 10 for draining water, recirculating water, storing water, etc.

A recirculating solenoid 154 may be coupled to the recirculating valve 130 on the recirculating solenoid side 156 and a drain solenoid 158 may be coupled to the drain valve 144 on the drain solenoid side 160. In some examples, the recirculating solenoid 154 and the drain solenoid 158 may be generally perpendicular to the recirculating outlet 136 and the drain outlet 150, respectively. Furthermore, the recirculating solenoid 154 and the drain solenoid 158 may be positioned near the front of the washing machine 10.

The recirculating solenoid 154 and the drain solenoid 158 may be in electrical communication with the controller 20 in order to control water flow in and out of the recirculating valve 130 and the drain valve 144, respectively. In some examples, the recirculating valve 130 and the drain valve 144 include gates, or valves, within their respective bodies, which are normally closed. The controller 20 may send a signal to one or both of the recirculating valve 130 and the drain valve 144 that triggers the "gate" to open such that water can flow into the recirculating inlet 132 and/or the drain inlet 146 and continue through to the recirculating outlet 136 and/or the drain outlet 150. When the "gate" of the recirculating valve 130 or the drain valve 144 is closed, water flow is typically restricted. While the recirculating valve 130 and the drain valve 144 have been described as normally closed, any suitable valve and valve mechanism may be used and any combination thereof. For example, the recirculating valve 130 and/or the drain valve 144 may be normally open, and may include a plunger actuator, a linear actuator, etc.

Figure 4:
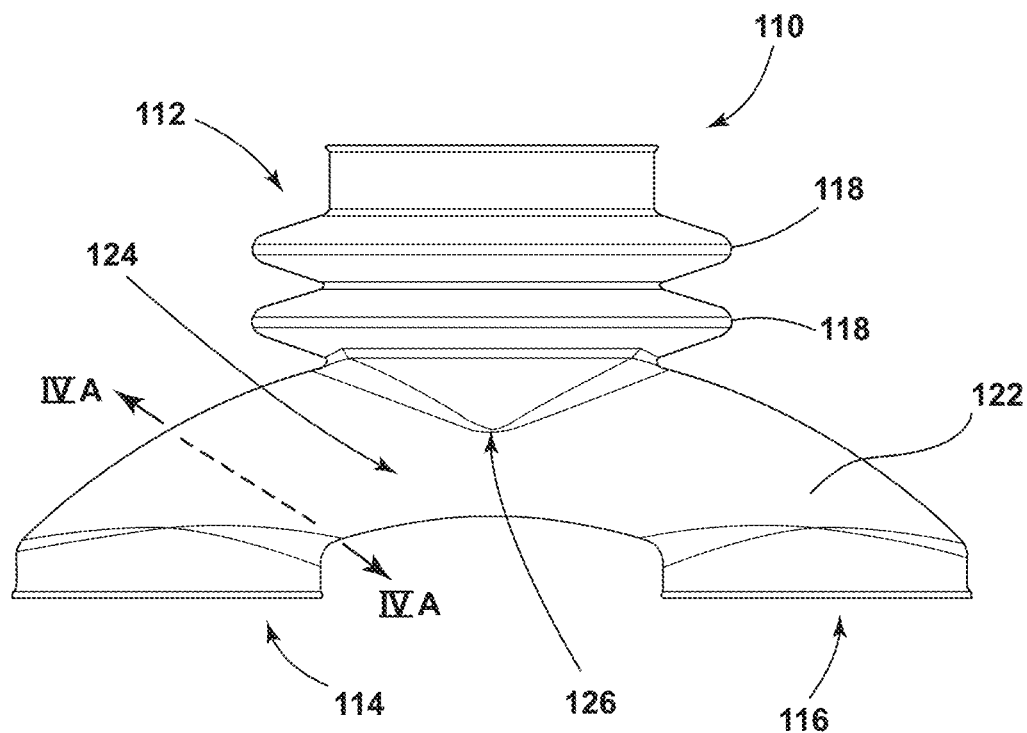
FIG. 4 is a front elevational view of a Y-hose according to various aspects described herein.
Figure 4A:
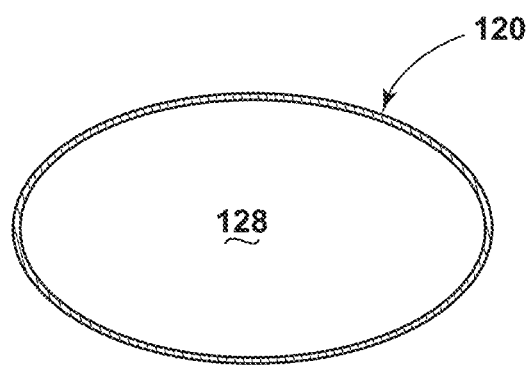
FIG. 4A is a cross-sectional view of line IVA of FIG. 4.

FIG. 4 illustrates a front elevational view of the Y-hose 110. The recirculating end 114 and the drain end 116 may be connected, or fluidly coupled, via a continuous wall 122. The continuous wall 122 may be in the form of a hollow arc, or arch, where at least a portion of the continuous wall 122 includes an elliptical cross-section 120. In some examples, the recirculating end 114 and the drain end 116 are a reflected duplication of each other. Furthermore, at least a portion of the recirculating end 114 and at least a portion of the drain end 116 may include the elliptical cross-section. FIG. 4A illustrates an exemplary cross-sectional view of line IVA showing the elliptical cross-section 120 of the continuous wall 122 having a hollow interior 128. In some examples, the cross-section along line IVA on the recirculating end 114, and the corresponding cross-section on the drain end 116, may be the smallest cross-sectional area of the Y-hose 110. Referring back to FIG. 4, the flexible end 112 may further include corrugation 118 and may be positioned at a center 124 of the continuous wall 122. In some examples, the flexible end 112 includes an apex 126 formed at the center 124 of the continuous wall 122.

The continuous wall 122 typically cooperates with the flexible end 112 to produce a laminar flow of fluid through the recirculating end 114, the drain end 116, or both. Additionally, the continuous wall 122 includes a generally smooth arch that traverses between and separates the recirculating and drain ends 114, 116. This configuration of the Y-hose 110 produces the laminar flow of fluid that provides efficient draining of fluid from the tub 14 and to the recirculating and drain outlets 136, 150. The smooth arch of the continuous wall 122 also provides sufficient separation between the recirculating and drain ends 114, 116 so that the recirculating and drain valves 130, 144 can be positioned for convenient attachment to the Y-hose 110.

Benefits of the drain system 100 according to aspects described herein can include improved drain performance such that drain time is reduced. The dual drain system 100 can be assembled from a single drain system as a field-installed kit. In this way, the washing machine 10 may originally include a single valve and a single hose. By replacing an original inlet hose with the Y-hose, a second valve and a second hose may be installed. It is also contemplated that two new valves, which may be identical, are installed such that a user can keep the original valve as a spare part. Alternatively, the dual drain system 100 may be factory installed.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A drain system for an appliance comprising:
   a Y-hose having a flexible end coupled to a supply of water from an appliance, a recirculating end, and a drain end;
   a recirculating valve having a recirculating inlet coupled to the recirculating end at a recirculating inlet side and a recirculating outlet coupled to a first hose at a recirculating outlet side;
   a drain valve spaced from the recirculating valve having a drain inlet coupled to the drain end at a drain inlet side and a drain outlet coupled to a second hose at a drain outlet side;
   a recirculating solenoid coupled to the recirculating valve on a recirculating solenoid side of the recirculating valve; and
   a drain solenoid coupled to the drain valve on a drain solenoid side of the drain valve.

2. The drain system for an appliance according to claim 1, wherein the flexible end comprises corrugation.

3. The drain system for an appliance according to claim 1, wherein the recirculating outlet and the drain outlet are arranged on opposite sides of the recirculating valve and the drain valve.

4. The drain system for an appliance according to claim 1, wherein the first hose is coupled to a recirculation hose fluidly coupled with the appliance.

5. The drain system for an appliance according to claim 1, wherein the at least a portion of the recirculating end and at least a portion of the drain end comprise a hollow elliptical cross section.

6. The drain system for an appliance according to claim 1, wherein the recirculating end and the drain end are connected via a continuous connecting wall defining an arc.

7. The drain system for an appliance according to claim 6, wherein the flexible end is positioned at a center of the continuous connecting wall.

8. The drain system for an appliance according to claim 1, wherein the recirculating end is spaced from the drain end.

9. The drain system for an appliance according to claim 1, wherein the recirculating outlet is generally perpendicular to the recirculating solenoid and the drain outlet is generally perpendicular to the drain solenoid.

10. The drain system for an appliance according to claim 1, wherein the recirculating solenoid and the drain solenoid are positioned towards a front of the appliance and the appliance comprises a washing machine.

11. The drain system for an appliance according to claim 1, wherein the first and second hoses are directed towards a rear of the appliance and the appliance comprises a washing machine.

12. A drain system for an appliance comprising:
    a Y-hose having a flexible end coupled to a supply of water from a tub, a recirculating end, and a drain end;
    a recirculating valve coupled with the recirculating end;

a drain valve spaced from the recirculating valve and coupled with the drain end; and wherein the recirculating end and the drain end are connected via a continuous connecting wall defining a hollow arc.

13. The drain system for an appliance according to claim 12, wherein at least a portion of the arc comprises an elliptical cross section.

14. The drain system for an appliance according to claim 12, wherein the flexible end is positioned at a center of the continuous connecting wall.

15. A drain system for an appliance comprising:
a Y-hose having a flexible end coupled to a supply of water from a tub, a recirculating end, and a drain end;
a recirculating valve having a recirculating inlet rigidly coupled to the recirculating end at a recirculating inlet side and a recirculating outlet coupled to a first hose at a recirculating outlet side;
a drain valve spaced from the recirculating valve having a drain inlet rigidly coupled to the drain end at a drain inlet side and a drain outlet coupled to a second hose at a drain outlet side;
a recirculating solenoid coupled to the recirculating valve on a recirculating solenoid side of the recirculating valve;
a drain solenoid coupled to the drain valve on a drain solenoid side of the drain valve; and wherein the recirculating outlet and the drain outlet are arranged on opposite sides of the recirculating valve and the drain valve and the first hose is coupled to a recirculation hose fluidly coupled with the appliance.

16. The drain system for an appliance according to claim 15, wherein the flexible end comprises corrugation.

17. The drain system for an appliance according to claim 15, wherein the recirculating outlet is generally perpendicular to the recirculating solenoid and the drain outlet is generally perpendicular to the drain solenoid.

18. The drain system for an appliance according to claim 15, wherein the at least a portion of the recirculating end and at least a portion of the drain end comprise a hollow elliptical cross section.

19. The drain system for an appliance according to claim 15, wherein the recirculating end and the drain end are connected via a continuous connecting wall defining an arc.

20. The drain system for an appliance according to claim 19, wherein the flexible end is positioned at a center of the continuous connecting wall.

* * * * *